United States Patent [19]
Ideta

[11] Patent Number: 6,038,635
[45] Date of Patent: Mar. 14, 2000

[54] MICROCOMPUTER CONTAINING FLASH EEPROM THEREIN

[75] Inventor: Masako Ideta, Tokyo, Japan

[73] Assignee: NEC Corporation, Tokyo, Japan

[21] Appl. No.: 09/017,878

[22] Filed: Feb. 3, 1998

[30] Foreign Application Priority Data

Feb. 5, 1997 [JP] Japan .................................. 9-037172

[51] Int. Cl.[7] ................................................ G06F 12/00
[52] U.S. Cl. .......................................................... 711/103
[58] Field of Search ..................................... 711/103, 154, 711/161, 170, 158, 102, 5; 713/600

[56] References Cited

U.S. PATENT DOCUMENTS

| | | | |
|---|---|---|---|
| 5,890,191 | 3/1999 | Espinor et al. | 711/103 |
| 5,926,826 | 7/1999 | Ninomiya et al. | 711/103 |
| 5,937,423 | 8/1999 | Robinson | 711/103 |
| 5,944,837 | 8/1999 | Talreja et al. | 713/600 |
| 5,950,222 | 9/1999 | Yamada et al. | 711/103 |
| 5,953,737 | 9/1999 | Estakhri et al. | 711/5 |
| 5,956,742 | 9/1999 | Fandrich et al. | 711/158 |

FOREIGN PATENT DOCUMENTS

| | | |
|---|---|---|
| 4-069742 | 3/1992 | Japan . |
| 5-266219 | 10/1993 | Japan . |

*Primary Examiner*—John W. Cabeca
*Assistant Examiner*—Fred F. Tzeng
*Attorney, Agent, or Firm*—Foley & Lardner

[57] ABSTRACT

It is intended to provide a microcomputer which does not require to have a programmable RAM therein, or to have an external memory, and can attain erase/write of a program. The microcomputer comprises an EEPROM 2, a ROM 3 storing a program indicating an erase and write procedure of the EEPROM (hereinafter called a boot program), and a CPU 5, wherein there is provided a mode to select a boot program in the EEPROM and a program in the ROM by an address to be accessed, and to executed the selected one with the CPU.

4 Claims, 13 Drawing Sheets

| VPL | EXCLUSIVE REGISTER (2BITS) | | ROM DESIGNATING SIGNAL | CS1 | CS2 |
|---|---|---|---|---|---|
| 0 | 0 | 0 | × | 0 | 1 |
| 0 | 0 | 1 | 0 | 0 | 1 |
| 0 | 0 | 1 | 1 | 1 | 0 |
| 0 | 1 | 0 | × | 1 | 0 |
| 0 | 1 | 1 | × | 1 | 0 |
| 1 | × | × | × | 1 | 0 |

| EX AT RS ↑ | EXCLUSIVE REGISTER (1BIT) | CS | $\overline{CS}$ |
|---|---|---|---|
| 0 | 0 | 0 | 1 |
| 0 | 1 | 1 | 0 |
| 1 | × | 1 | 0 |

28 EX TERMINAL ─────────────────

29 VPP TERMINAL─────────────────

26 RS TERMINAL ─────────┌────────

3 ROM

MICROCOMPUTER CONTAINING FLASH EEPROM THEREIN

BACKGROUND OF THE INVENTION

1. Field of the Invention

The present invention relates to a microcomputer, and, more particularly, to a microcomputer containing as nonvolatile memory therein an electrically erasable and programmable read-only memory (EEPROM), more particularly a batch erasable flash EEPROM.

2. Description of the Related Art

As related art of flash EEPROMs, Japanese Patent Application Laid-Open Hei 5-266219 proposes the configuration of a microcomputer containing therein a central processing unit (CPU), a random access memory (RAM), and a flash EEPROM, wherein the microcomputer can perform various operations by rewriting or changing contents of storage such as programs, data or the like stored in the flash EEPROM while it is mounted in a system unit.

The above patent application discloses configurations of a first microcomputer only having a flash EEPROM in which the flash EEPROM is used in place of a read-only memory (ROM), and a second microprocessor having a ROM in addition to the flash EEPROM.

Both microcomputers have two different modes of a mode rewriting the flash EEPROM under write control of the CPU (hereinafter called the "CPU rewrite control mode"), and a mode rewriting it under control of an external device such as a general purpose PROM writer (hereinafter called the "external rewrite control mode").

Here, it is possible to properly use the modes in such a manner that the external rewrite control mode is mainly applied to writing of initial data and initial programs related to mount the microcomputer on the system, while the CPU rewrite control mode is used for a case in tuning data or debugging the programs while running the microcomputer.

More specifically, in the case of external rewrite mode, for both the first and second microcomputers, the flash EEPROM becomes a state where it can be directly accessed by the general purpose PROM writer externally provided, and other components such as the CPU not relating to rewrite control of the EEPROM becomes a state where they are disconnected from the flash EEPROM.

On the other hand, in the case or CPU rewrite control mode, for the first microcomputer, the contents of storage of the flash EEPROM is rewritten under control of the CPU. In this case, a rewrite control program and a transfer control program are previously written in a predetermined region of the flash EEPROM, and the CPU executes the transfer control program to transfer the rewrite control program to the RAM. After completion of transfer, the process on the CPU proceeds to execute the rewrite control program on the RAM, whereby erase or write is performed for the flash memory. On the other hand, the second microcomputer stores in a mask ROM data and programs which are not necessary to be rewritten. In the CPU rewrite control mode, the CPU performs control for erase or write for the flash EEPROM according to a rewrite control program written in the flash EEPROM, or a rewrite control program stored in the mask ROM.

Here, codes for write in the flash EEPROM are received by using an interface function contained the first and second microcomputers.

However, there are various interfaces to be connected to such microcomputers, and, if the interfaces to be connected is limited to a built-in interface, it cannot fully meet demands of the user.

In addition, the erase/write program for the flash EEPROM requires a complicated erase/write procedure. Since details of such procedure is typically changed in response to change of manufacturing conditions for devices including the flash EEPROM, when the first microcomputer is used, if a device manufacturer changes its design or manufacturing conditions, the user is forced to change the erase/write procedure for such changed conditions.

On the other hand, the second microcomputer cannot meet changes of the ROM program for erasing or writing the flash EEPROM.

Then, to solve such problems, a microcomputer has proposed which is comprising an EEPROM, being capable of meeting various interfaces, and of selectively changing over between a mode for erasing or writing the EEPROM by fixedly executing a program on a ROM through use of a standardized built-in interface (hereinafter called the "exclusive program mode"), and a mode for modifying parts or all of user programs stored in the flash EEPROM by executing a program other than that on the ROM (hereinafter called the "user program mode"), and making both modes the CPU rewrite control programs, thereby minimizing a RAM area occupied by programs being down loaded.

In the microcomputer described in the related application, when the device manufacturer incorporates the erase/write program for flash EEPROM relating to the design and manufacturing conditions specific to the device as a one specific for the device during its manufacturing phase in a form of mask ROM or the like, the user is released from burden on change of the erase/write program due to a change by the device manufacturer.

In addition, the microcomputer described in the related application comprises a flash EEPROM, and a ROM containing an erase/write procedure for the EEPROM, wherein switching between the flash EEPROM and the ROM is not only performed with the state of an external terminal in resetting but also can be implemented by an exclusive register controllable by the CPU. Since the exclusive program mode and the user program mode can be changed over each other by setting of the exclusive register, the ROM can be directly accessed from the CPU in the user program mode. This causes the erase/write operation for the flash EEPROM in each mode as follows.

First, the ROM contains the erase/write program for flash EEPROM specific to the microcomputer, while the flash EEPROM contains a user program and a communication control program used by the user program. The communication control program is to receive rewrite data for the flash EEPROM from outside. In this state, when the exclusive program mode is set by setting of the external terminal, after resetting is released, the CPU fixedly executes the erase/write program for EEPROM stored in the ROM to erase or write the flash EEPROM. The operation for executing the program stored in the ROM in this manner is called a "first mode."

On the other hand, in the user program mode after the user program is once written in the flash EEPROM, after resetting is released, the CPU executes the user program written in the flash EEPROM. Then, if it is necessary to rewrite a part of the user program for tuning or the like, the communication control program stored in the flash EEPROM and the program for switching between the flash EEPROM and the ROM (an exclusive register setting instruction or the like) are transferred to the RAM, and then the erase or write operation is executed according to information such as addresses, data and parameters transferred to the RAM. Such operation according to information other than the program stored in the ROM is called a "second mode." The second mode uses the program transferred to the RAM to set the exclusive register under control of the CPU, and to access the ROM containing the erase/write procedure for the flash EEPROM therein.

As described, since the second mode of the microcomputer can use the erase/write procedure for flash EEPROM stored in the ROM, it does not require, as in the microcomputer described in Japanese Patent Application Laid-Open No. 5-266219, to previously download to the RAM all of a program for executing external to the ROM or chip the erase/write procedure for flash EEPROM (rewrite control program), and a program containing a communication protocol with a host device external to the chip for providing write codes (communication control program).

Now, the operation of the microcomputer describes with reference to FIGS. 9–15.

Figure 9:
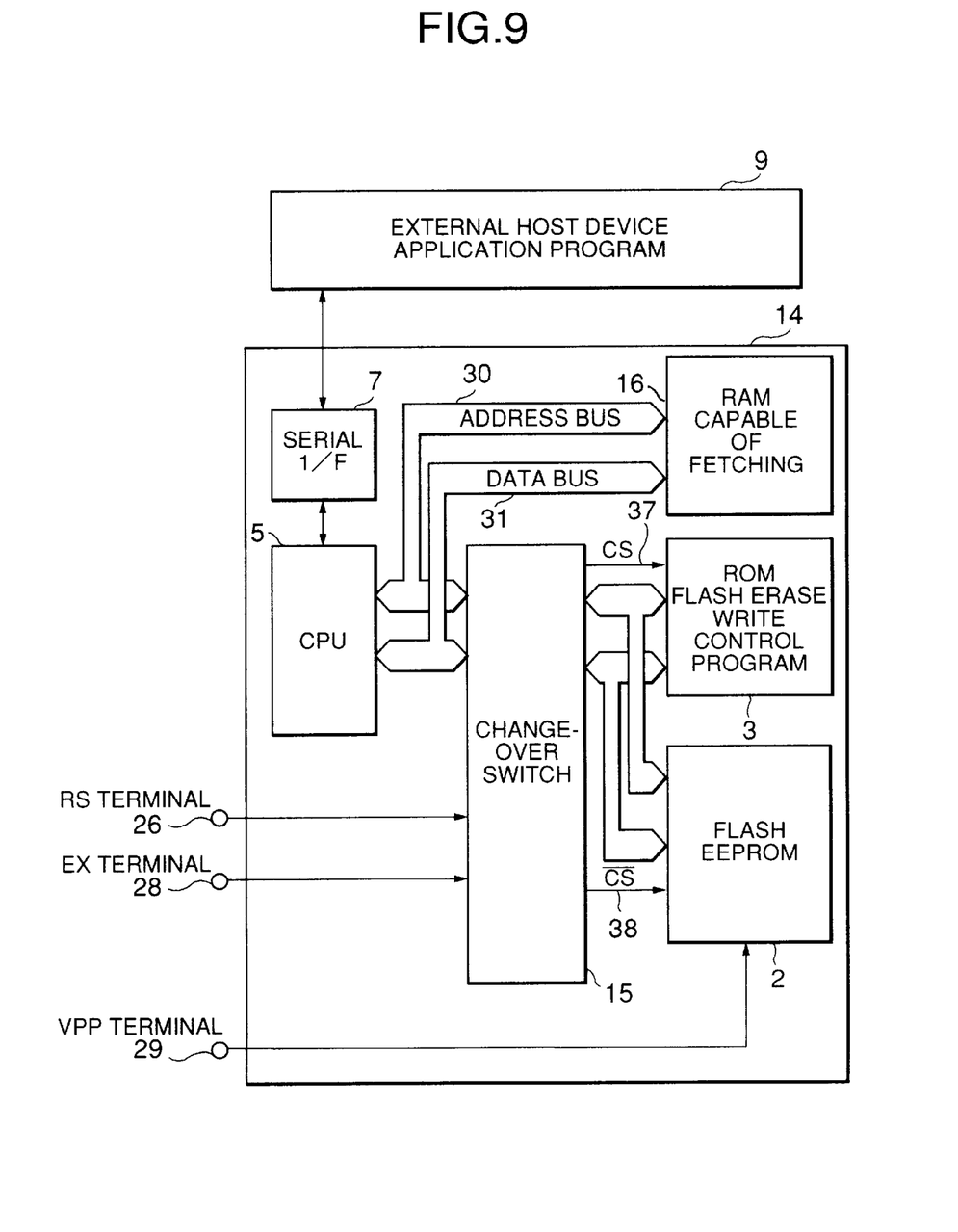
FIG. 9 is a block diagram of an arrangement of a microprocessor.

Referring to FIG. 9, a microcomputer 14 comprises a CPU 5, a flash EEPROM 2, a ROM 3 storing an erase/write procedure, a RAM 16 capable of fetching, a change-over switch 15, a serial interface (hereinafter called the "serial I/F") 7 for transmitting and receiving data to and from outside, a reset or RS terminal 26, an external or EX terminal 28, and a supply voltage or VPP terminal 29 for the flash EEPROM. In addition, provided external to the microcomputer 14 is an external host device 9 such as a PROM writer storing an application program. Here, the application program means to be a program usually used for controlling hardware or performing data processing, and for rewriting the flash EEPROM.

Figure 10:
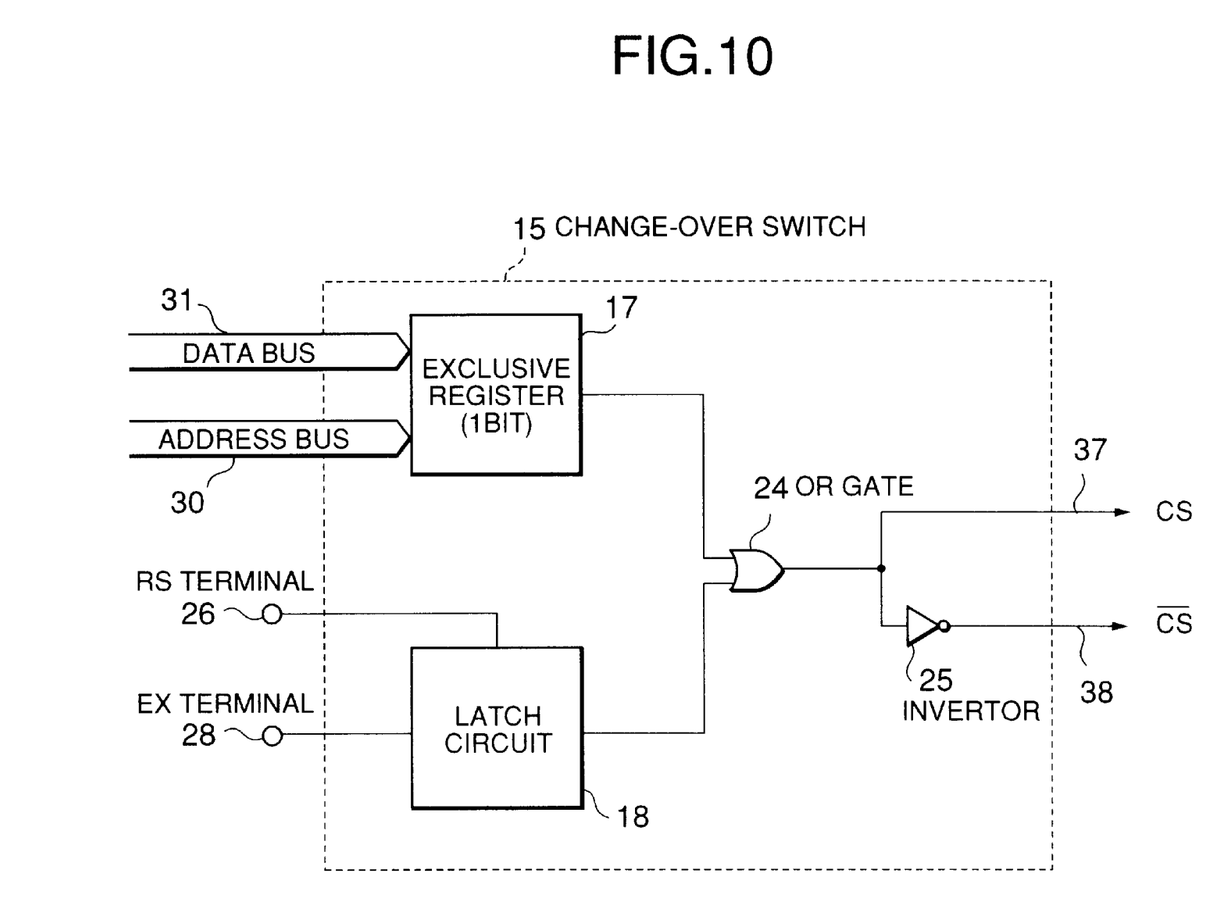
FIG. 10 is an arrangement of a change-over switch in the microcomputer shown in FIG. 9.
Figure 11:
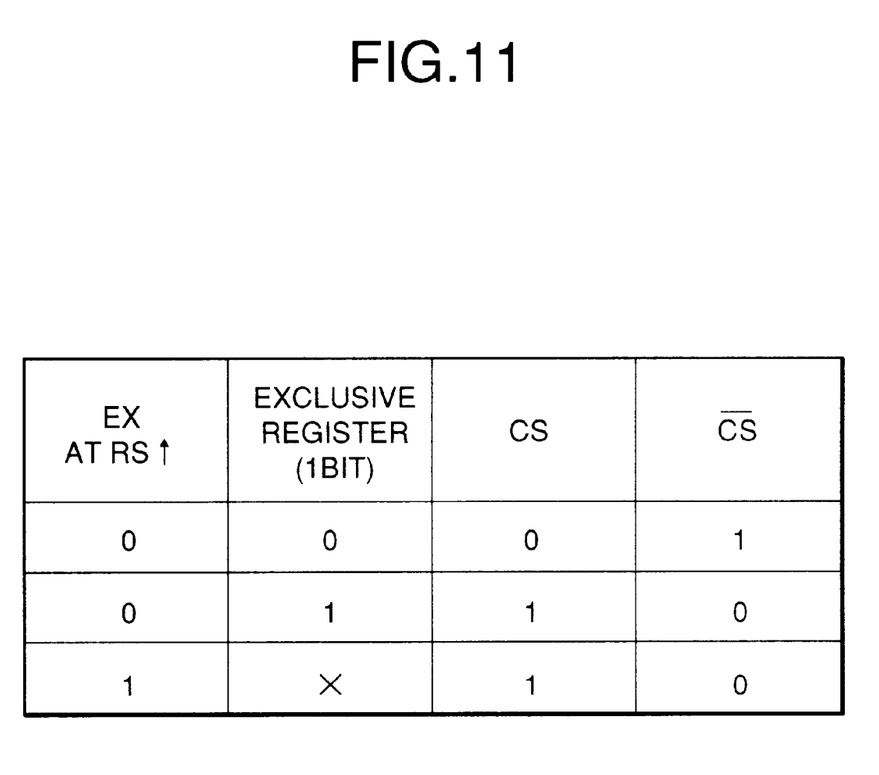
FIG. 11 is an arrangement of a change-over switch 15 in the microcomputer shown in FIG. 9.

Referring to FIGS. 10 and 11, the change-over switch 15 comprises an exclusive register 17 (one bit), a latch circuit 18 for latching a logical value of the EX terminal 28 when the RS terminal 26 rises, and an OR gate 24 with output of the exclusive register 17 and output of the latch circuit 18 as its inputs. Output of the OR gate 24 is directly connected to the ROM 3 as a CS (chip select) signal 37, and to the flash EEPROM 2 through an invertor 25 as CS⁻ signal 38 (symbol ⁻ indicating inversion). Thus, it is possible to exclusively select either one of the flash EEPROM 2 or the ROM 3 with the CS⁻ signal 38 of the CS signal 37. FIGS. 10 and 11 are divided for the convenience of preparation of drawings.

Referring to FIG. 9, the ROM 3 stores an erase/write procedure for EEPROM (EEPROM write control program which can be commonly used for the first and second modes, and a communication control program for controlling communication (receiving) of write data. In addition, the exclusive programming mode is specified by latching state "1" of the EX terminal 28 with the latch circuit 18, or by setting a logical value "1" in the exclusive register 17 from the CPU 5. In this case, the CS signal 37 becomes the high level, and the CS⁻ signal 38 becomes the low level, so that the ROM 3 is selected.

Figure 12:
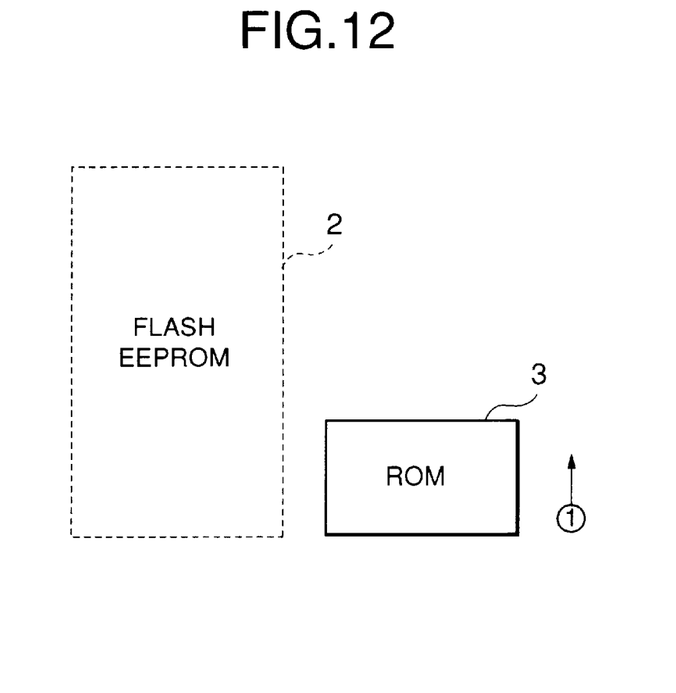
FIG. 12 is a program execution state in a first mode of the microcomputer shown in FIG. 9.
Figure 13:
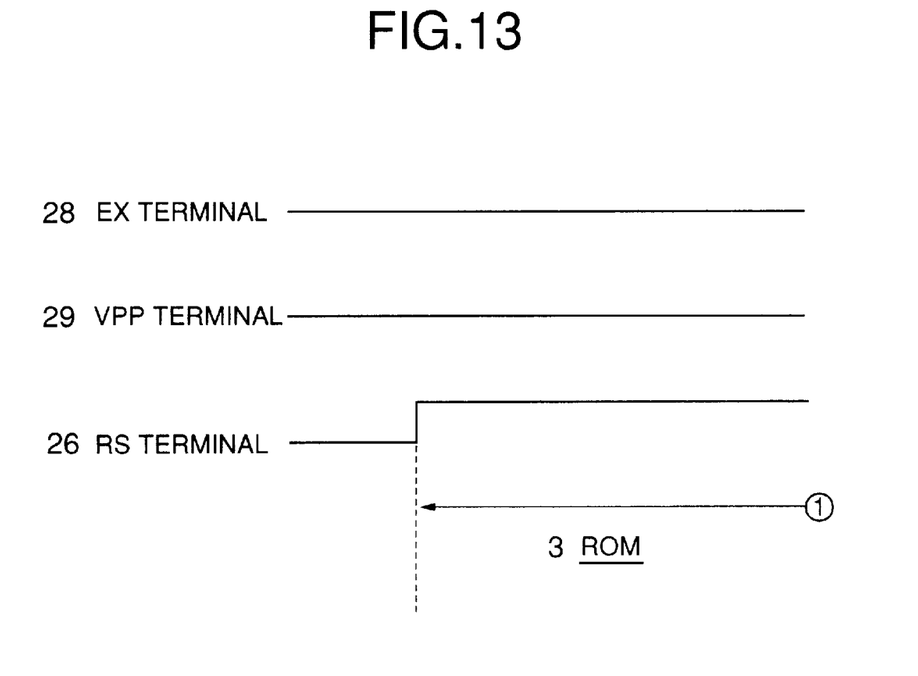
FIG. 13 is a program execution state in a first mode of the microcomputer shown in FIG. 9.

When the latch circuit 18 latches a logical value "1," the microcomputer 14 becomes the first mode, wherein, as shown in FIGS. 12 and 13, the CPU 5 fixedly executes the EEPROM rewrite control program stored in the ROM 3 to perform erase or write to the flash EEPROM 2. That is, in the first mode, the flash EEPROM 2 is accessed as a peripheral device by the CPU 5. FIGS. 12 and 13 are divided for the convenience of preparation of drawings.

On the other hand, when the latch circuit 18 latches a logical value "0," the microcomputer 14 becomes the user program mode. When a program in the flash EEPROM 2 is rewritten by a user program therein, it becomes the second mode. In this case, the CS signal 37 become the low level, and the CS⁻ signal 38 becomes the high level, so that the flash EEPROM 2 is selected.

Figure 14:
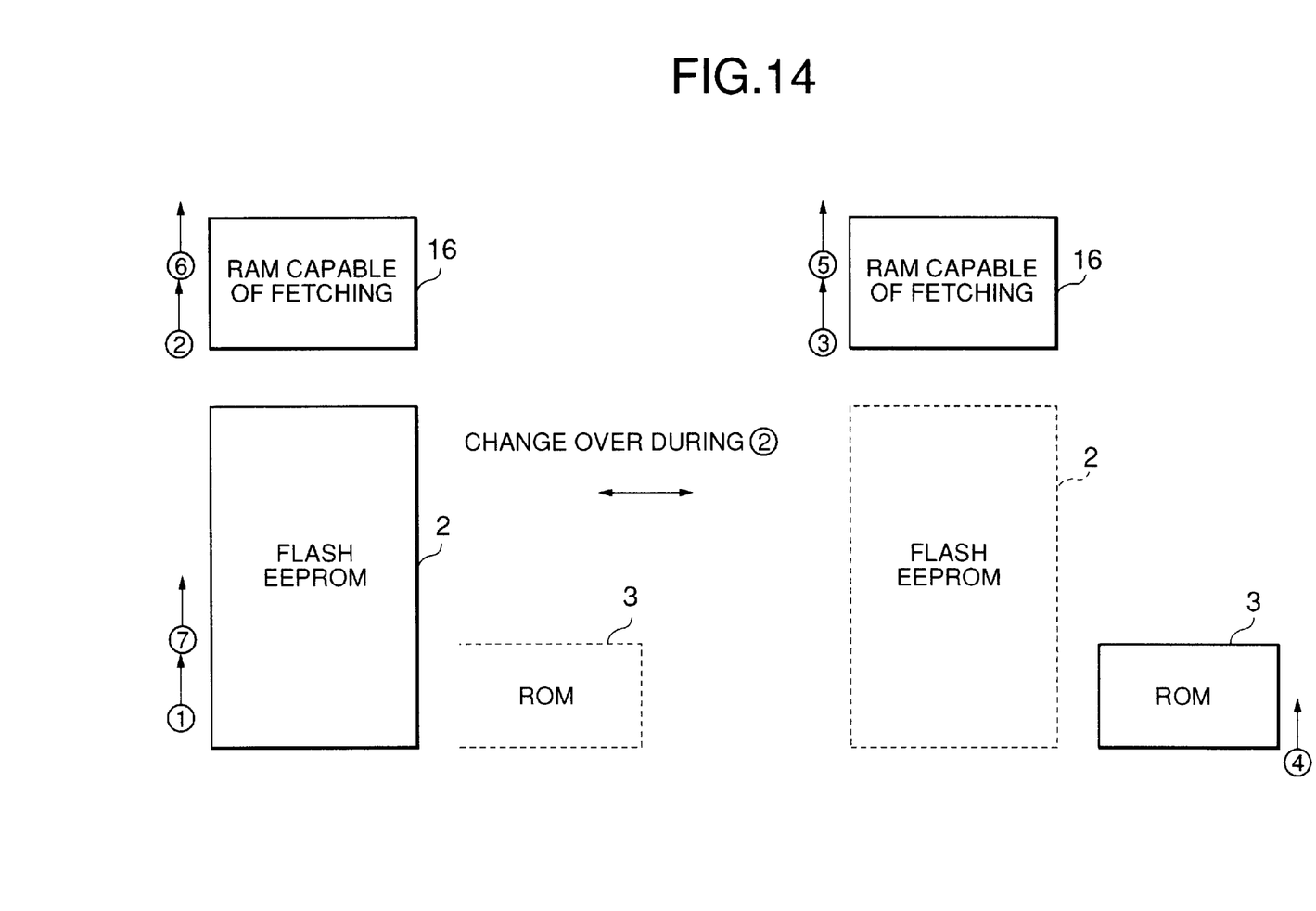
FIG. 14 is a program execution state in a second mode of the microcomputer shown in FIG. 9.
Figure 15:
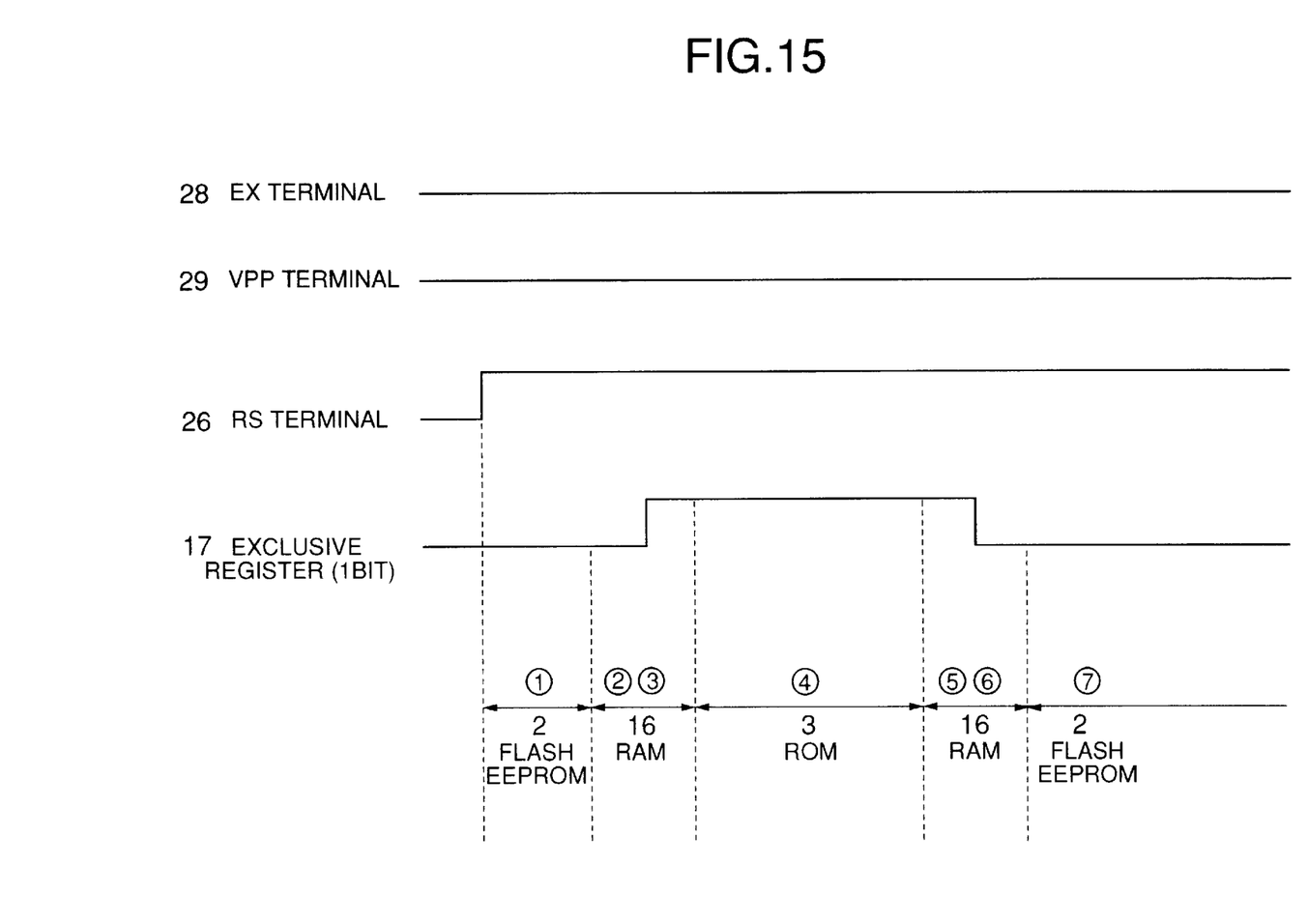
FIG. 15 is a program execution state in a second mode of the microcomputer shown in FIG. 9.

In the second mode, the microcomputer 14 transmits and receives the application program stored in the external host device 9 using communication means such as the serial I/F 7 in the user program mode (1), as shown in FIGS. 14 and 15. Subsequently, after downloaded to the RAM 16 capable of fetching are the program for changing over the flash EEPROM 2 and the ROM 3 in a user program stored in the flash EEPROM 2, and information such as addresses, data and parameters necessary for rewriting the flash EEPROM 2, the process branches to the RAM 16 (see (2) in FIGS. 14 and 15), and the logic of the exclusive register 17 is set to "1" by the transferred program for switching between the flash EEPROM 2 and the ROM 3, so that it transfers to the exclusive program mode (see (3) in FIGS. 14 and 15). In this case, the CS signal 37 become the high level, and the CS⁻ signal 38 becomes the low level, so that the ROM 3 is selected. FIGS. 14 and 15 are divided for the convenience of preparation of drawings.

Thereafter, the process branches to the ROM 3 in which the erase/write procedure for EEPROM is stored to execute the erase/write operation of the flash EEPROM 2 (see (4) in FIGS. 14 and 15).

After completion of rewrite, the process branches again to the RAM 16 (see (5) in FIGS. 14 and 15), and sets the logic of the exclusive register to "0," so that it transfers to the user program mode (see (6) in FIGS. 14 and 15).

Then, it returns to the normal operation mode, whereby the rewritten application program in the flash EEPROM starts to be executed (see (7) in FIGS. 14 and 15).

That is, since, in the second mode, the program erase/write program can be commonly used with the program of the first mode, the required capacity of RAM 16 capable of fetching can be reduced by the amount which is saved by the fact that the flash write control program is not necessary to be transferred to the RAM in tuning the user program.

However, since the microcomputer containing the flash EEPROM therein which performs erase and write with the above-described erase/write method exclusively changes over the flash EEPROM in the user program mode, when the user wished to change the program, he/she must once download the program for switching between the flash EEPROM and the ROM, and information such as addresses, data and parameters necessary for rewriting the flash EEPROM from the flash EEPROM to the RAM before performing the erase/write operation according to the information. Thus, it has a problem that it must contains a programmable RAM, or connect an external memory.

Furthermore, capacity of the RAM should be larger than size of a program and data to be transferred. In addition, since the program is evacuated to the RAM, it also takes time in switching between the flash EEPROM and the ROM.

BRIEF SUMMARY OF THE INVENTION

OBJECT OF THE INVENTION

Therefore, the present invention is made in view of the above-mentioned problems. Its object is to provide a microcomputer which does not require to contain a programmable RAM, and to have an external memory, and which can attain erase or write of a program.

SUMMARY OF THE INVENTION

To attain the above object, the present invention provides a microcomputer containing a flash EEPROM therein, the microcomputer comprising an electrically erasable and programmable read-only memory (called an "EEPROM"), a read-only memory (called a "ROM") storing a program indicating an erase and write procedure for the EEPROM, and a central processing unit (called a "CPU"), the CPU executing an erase and write control program stored in the EEPROM (called a "boot program") and a program stored in the ROM to enable it to erase and write the EEPROM, wherein it further comprises a switching means for switching under control of the CPU between placing either one of the EEPROM or the ROM on a memory space and placing both the EEPROM and the ROM on the same memory space, and an arrangement in which the address for a region for storing the boot program does not overlap an address for a region of the ROM, the CPU being switched among a state where it executes only a program in the EEPROM, a state where it can directly and bidirectionally moves between the boot program and a program stored in the ROM, and a state where it executes only the program stored in the ROM, thereby erasing and writing the EEPROM.

In addition, in the present invention, the switching means comprises an exclusive register controlled by the CPU, and an address decoder detecting that the CPU accesses an address for the region of the ROM, when the exclusive register is in a first state, the EEPROM being made valid; when the exclusive register is in a second state, the ROM being made valid; when the exclusive register is in a third state, the ROM being made valid as the address decoder detects access to the region of the ROM, and the EEPROM being made valid as the address decoder does not detect access to the region of the ROM.

Furthermore, in the present invention, it further comprises high voltage detector means for detecting that input voltage at a predetermined external terminal is at any voltage higher than a supply voltage, a detection signal of the high voltage detector means being input into the switching means, when the detection signal is active, the ROM being forcibly made valid regardless of the state of the exclusive register or of the address decoder, whereby a program stored in the ROM can be executed after the microcomputer is initialized.

Furthermore, the present invention the input voltage at the predetermined external terminal can be also used as a power supply for erase and write of the flash EEPROM.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENT

Now, an embodiment of the present invention is described in the following. In its preferred embodiment, the present invention comprises a flash EEPROM (2 in FIG. 1), a ROM (3 in FIG. 1) storing a program indicating an erase and write procedure of the flash EEPROM, a CPU (5 in FIG. 1), the CPU executing an erase and write control program stored in the flash EEPROM (called a "boot program") and a program stored in the ROM (3 in FIG. 1), thereby enabling it to erase and write the flash EEPROM (2 in FIG. 1), and a change-over switch (4 in FIG. 1) for switching whether one of the flash EEPROM and the ROM is placed in a memory space, or both of them are placed in the same memory space under control from the CPU. Then, it is arranged that an address for the boot program storing region does not overlap that for the ROM region. The CPU is arranged to be switched among a state where it executes only a program in the EEPROM, a state where it can directly and bidirectionally moves between the boot program and a program stored in the ROM, and a state where it executes only the program stored in the ROM, thereby erasing and writing the flash EEPROM.

According to the present invention, in its preferred embodiment, the change-over switch comprises an exclusive register (12 in FIG. 3) controlled by the CPU, and an address decoder (13 in FIG. 3) detecting that the CPU accesses an address for the region of the ROM, when the exclusive register is in a first state, the flash EEPROM (2 in FIG. 1) being made valid; when the exclusive register is in a second state, the ROM (3 in FIG. 1) being made valid; when the exclusive register is in a third state, the ROM being made valid as the address decoder detects access to the region of the ROM, and the flash EEPROM being made valid as the address decoder does not detect access to the region of the ROM.

In addition, according to the present invention, in its preferred embodiment, it is arranged to comprise a high voltage detector circuit (6 in FIG. 1) for detecting that input voltage at a predetermined external terminal is at any voltage higher than a supply voltage, a detection signal (VPL in FIG. 1) of the high voltage detector circuit being input into the change-over switch (see FIG. 3), when the detection signal is active, the ROM being forcibly made valid regardless of the state of the exclusive register (12 in FIG. 3) or of the address decoder (13 in FIG. 3), whereby a program stored in the ROM (3 in FIG. 1) can be executed after the microcomputer is initialized.

EXAMPLE

An example of the present invention is described with reference to the drawings to describe the above-described embodiment of the present invention in more detail.

Figure 1:
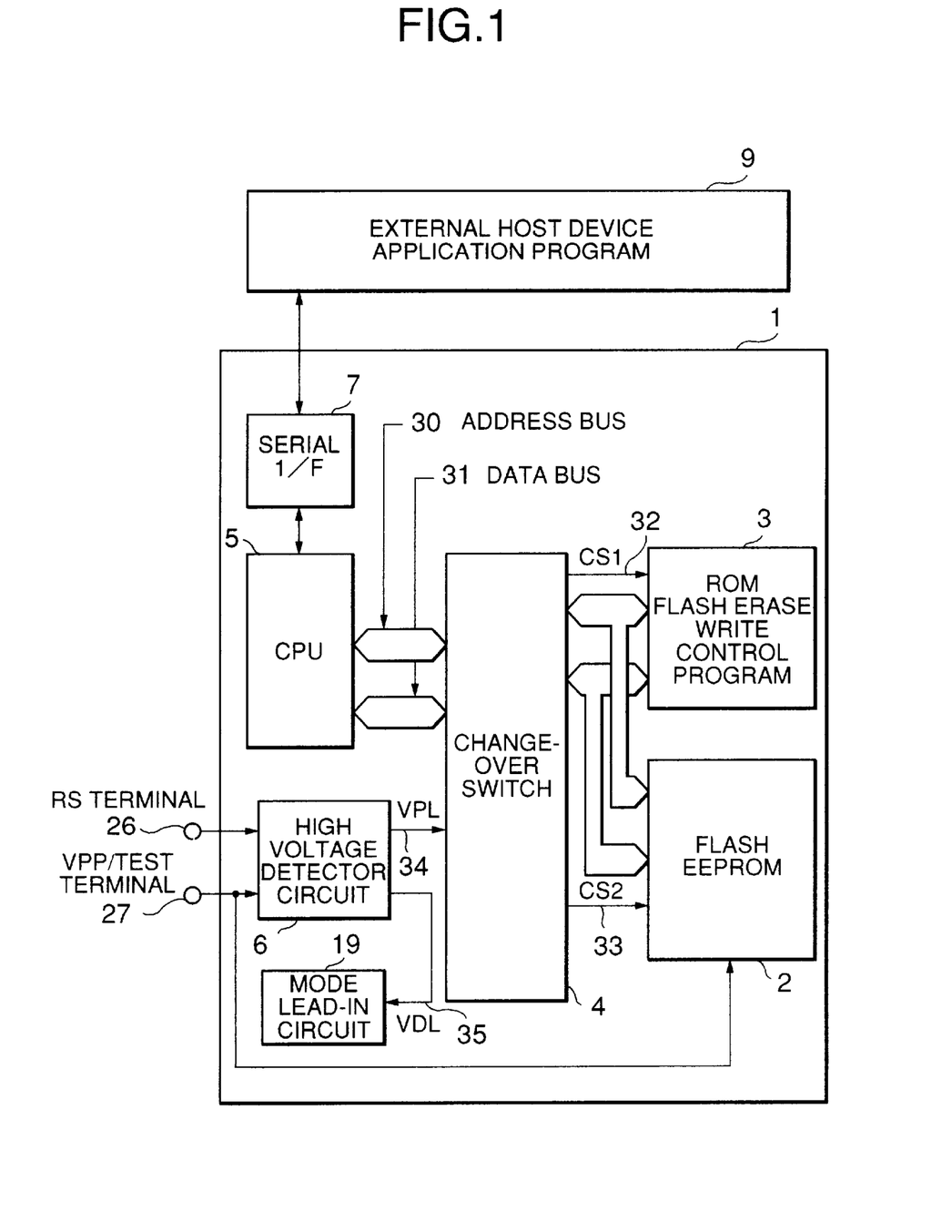
FIG. 1 is a block diagram showing an arrangement of an embodiment according to the present invention.

FIG. 1 shows an arrangement of an example of the present invention. Referring to FIG. 1, in the example, a microcomputer 1 containing therein a flash EEPROM for which erase and write can be performed with its own program comprises a CPU 5, a flash EEPROM 2 capable of being erased and written, a ROM 3 storing an erase and write procedure, a change-over switch 4, a high voltage detector circuit 6, a serial interface 7 for transmitting and receiving data with outside, a mode lead-in circuit 19, an RS terminal 26, and a VPP/TEST terminal 27. In addition, the example is provided with an external host device 9 such as a PROM writer storing an application program, which is external to the microcomputer.

Figure 2:
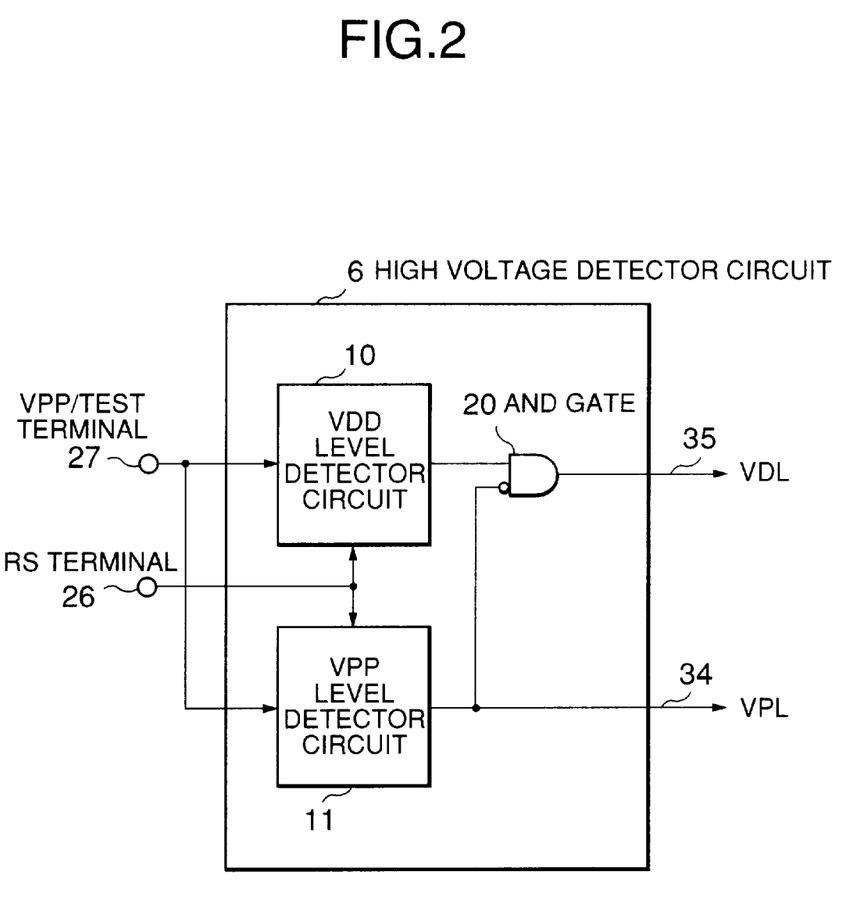
FIG. 2 is a block diagram showing an arrangement of a high voltage detector circuit in an embodiment according to the present invention.

FIG. 2 shows an example of arrangement of the high voltage detector circuit 6 in the example. Referring to FIG. 2, the high voltage detector circuit 6 comprises a VPP level detector circuit 11 which determines a voltage level at the TEST/VPP terminal 27 at the rising edge of an input signal of the RS terminal 26, and outputs a VPL signal 34 when a high voltage level is detected, a VDD level detector circuit 10 which also determines a voltage level at the TEST/VPP terminal 27 at the rising edge of an input signal of the RS terminal 26, and detects a VDD level, and an AND gate 20 which is input with a signal from which the VDD level is detected and an inversion of the VPL signal 34 and outputs a VDL signal 35.

Figure 3:
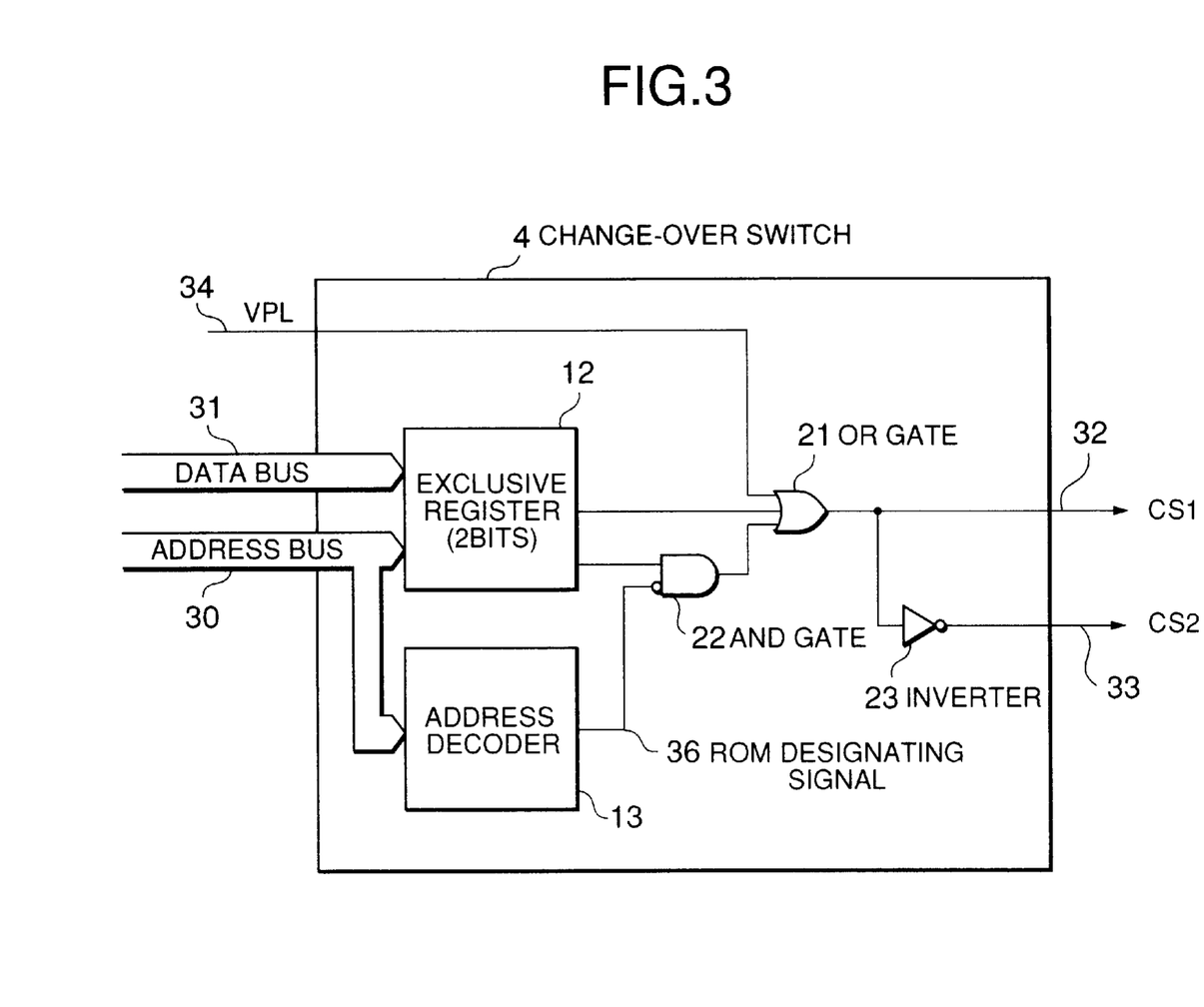
FIG. 3 is a block diagram showing an arrangement of a change-over switch in an embodiment according to the present invention.
Figure 4:
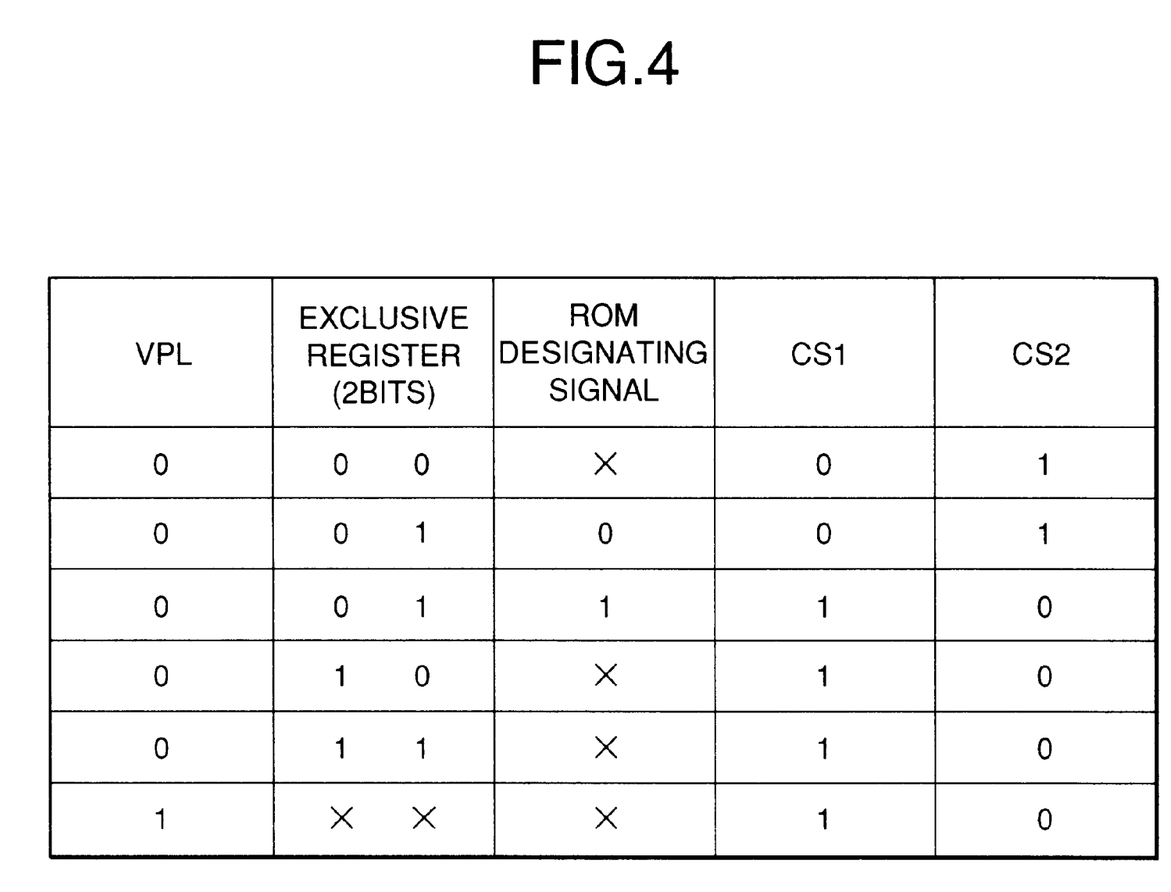
FIG. 4 is a truth table for explaining the operation of the change-over switch in an embodiment according to the present invention.

FIG. 3 shows an example of arrangement of the change-over switch 4 in the example. FIG. 4 illustrates the operation of the circuit shown in FIG. 3. FIGS. 3 and 4 are divided for the convenience of preparation of drawings. Referring to FIGS. 3 and 4, the change-over switch 4 comprises a two-bit ("00B" in the example) exclusive register 12 which can be accessed from the CPU 5 shown in FIG. 1 through an address bus 30/data bus 31, and initialized by an input to the RS terminal 26, an address decoder 13 which outputs a ROM designating signal 36 when an address of the region of ROM 3 shown in FIG. 1 is decoded, an AND gate 22 which is input with the lower bit of the exclusive register 12 and the ROM designating signal 36, an OR gate 21 which receives the VPL signal 34 output from the high voltage detector circuit 6, the upper bit of the exclusive register 12 and the output of the AND gate 22 as input, and outputs a CS1 signal (first chip select signal) 32, and an invertor 23 which receives and inverts the CS1 signal 32 as an input, and outputs it as a CS2 signal (second chip select signal) 33.

Now, the operation of the example is described.

Referring to FIG. 2, the high voltage detector circuit 6 detests and latches an input pattern with three values of 0 V level, VDD level (supply voltage level, for example 5 V), and VPP level (high voltage level, for example 10 V) according to the input signal level for the VPP/TEST terminal 27.

Referring to FIGS. 3 and 4, the change-over switch 4 makes active the CS1 signal 32 for designating the ROM 3 regardless of the value of ROM designating signal 36 when the VPL signal 34 is active, or when the upper bit of the exclusive register 12 connected to the CPU 5 is "1," whereby only the ROM 3 can be accessed (see FIG. 4).

In addition, when the VPL signal 34 is inactive, and when the exclusive register 12 is "00B," the CS2 signal 33 for designating the flash EEPROM 2 becomes active regardless of the value of ROM designating signal 26, whereby only the flash EEPROM 3 can be accessed.

Furthermore, when the VPL signal 34 is inactive, and when the exclusive register 12 is set to "01B," the ROM designating signal 36 becomes high if the address decoder 13 decodes an assignment address of the ROM 3 address assigned not to overlap a boot program region, whereby the CS1 signal 32 for designating the ROM 3 becomes active. If the address decoder 13 decodes an address other than the assignment address of ROM 3, the ROM designating signal 36 becomes low, whereby the CS2 signal 33 for designating the flash EEPROM 2 becomes active.

When the high voltage detector circuit 6 detect the VPP level, that is, when the VPL signal 34, the output of the high voltage detector circuit 6, is active (logical "1"), the CS1 signal 32, the output of the change-over switch 4, becomes high, and the CS2 signal 33 becomes low, the microcomputer 1 executes the flash EEPROM erase/write control program stored in the ROM 3 to rewrite the flash EEPROM 2 (hereinafter called the "on-board write mode").

Similarly, when 0 V is detected, that is, when both the VDL signal 35 and the VPL signal 34 are inactive, the CS1 signal 32 becomes low, and the CS2 signal 33 becomes high, so that the user programming mode is entered to execute a user program stored in the flash EEPROM 2.

In this mode, if the CPU 5 sets "1" to the upper level of the exclusive register 12, the CS1 signal 32 becomes high, and the CS2 signal 33 becomes low, so that the program in the ROM 3 can be executed. In addition, if "0" is set to the upper bit of the exclusive register 12, and "1" is set to the lower bit, since the address decoder outputs the ROM designating signal 36 at the high level when the CPU 5 accesses the region of ROM 3, the CS1 signal 32 becomes high, and the CS2 signal 33 becomes low, so that the program in the ROM 3 can be executed.

Since the address decoder 13 outputs a low-level ROM designating signal 36 when the CPU 5 accesses the region of the flash EEPROM 2, the CS1 signal 32 becomes low, and the CS2 signal 33 becomes high, so that the program in the flash EEPROM can be executed.

In the user programming mode, called a "self-programming mode" is such mode performing erase and write to the flash EEPROM by bidirectionally moving between the boot program in the flash EEPROM 2 and the flash erase/write control program in the ROM 3 with the setting of the exclusive register 12 from the CPU 5.

When the high voltage detector circuit 6 detects the VDD level, that is, when the VDL signal 35 is active, it can be used as an operation mode such as a TEST mode by the mode lead-in circuit 19 shown in FIG. 1. This operation is omitted for description because it does not relate to the present invention.

Figure 5:
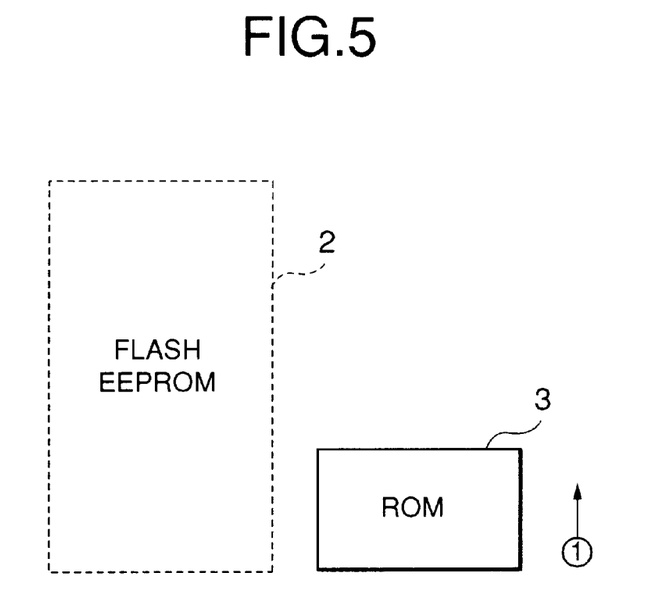
FIG. 5 is a program execution state in an on-board mode in an embodiment according to the present invention.
Figure 6:
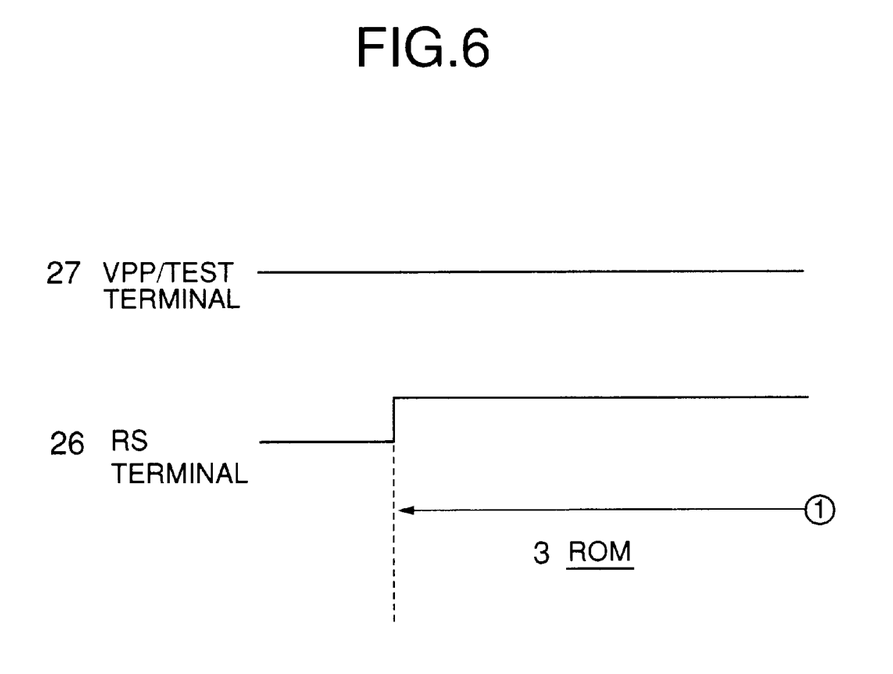
FIG. 6 is a program execution state in an on-board mode in an embodiment according to the present invention.

When the on-board write mode is specified, as shown in FIGS. 5 and 6, the ROM 3 is selected, the EEPROM rewrite control program contained therein being fixedly executed by the CPU 5 (see (1) in FIGS. 5 and 6), the program being written in the flash EEPROM 2. FIGS. 5 and 6 are divided for the convenience of preparation of drawings.

Figure 7:
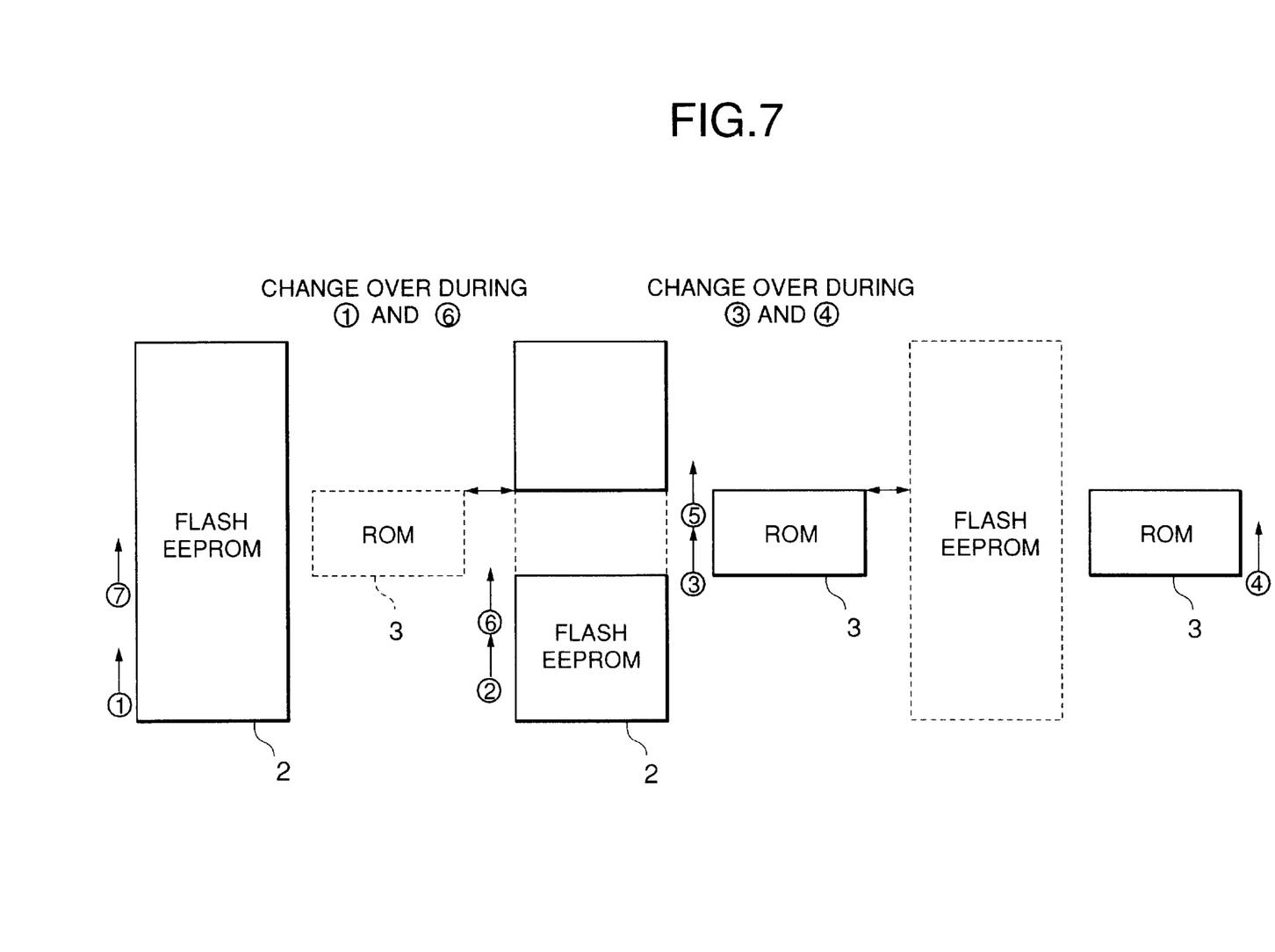
FIG. 7 is a program execution state in a self-programming mode in an embodiment according to the present invention.

In the self-programming mode, as shown in FIG. 5, setting of the exclusive register 12 is changed, so that the program is written in the flash EEPROM 2. More particularly, referring to FIG. 5, after resetting is released, a user program is executed (see (1) in FIG. 5, it being called a "user program mode"). FIG. 7 is a schematic diagram for illustrating the operation of the example, while FIG. 8 is a timing chart and transition of a memory to be accessed.

In this case, the user transmits and receives an application program stored in the external host device 9 by externally using communication means such as the serial interface 7.

Then, the process transfers to the mode accessible to both the flash EEPROM 2 and the ROM 3 by setting the exclusive register 12 ("01B" in the example, where "B" means a binary representation) (hereinafter called a "self-programming mode 1") (see (2) in FIGS. 7 and 8). Thus, the flash EEPROM becomes possible to be rewritten by applying high voltage level to the VPP/TEST terminal 27.

Figure 8:
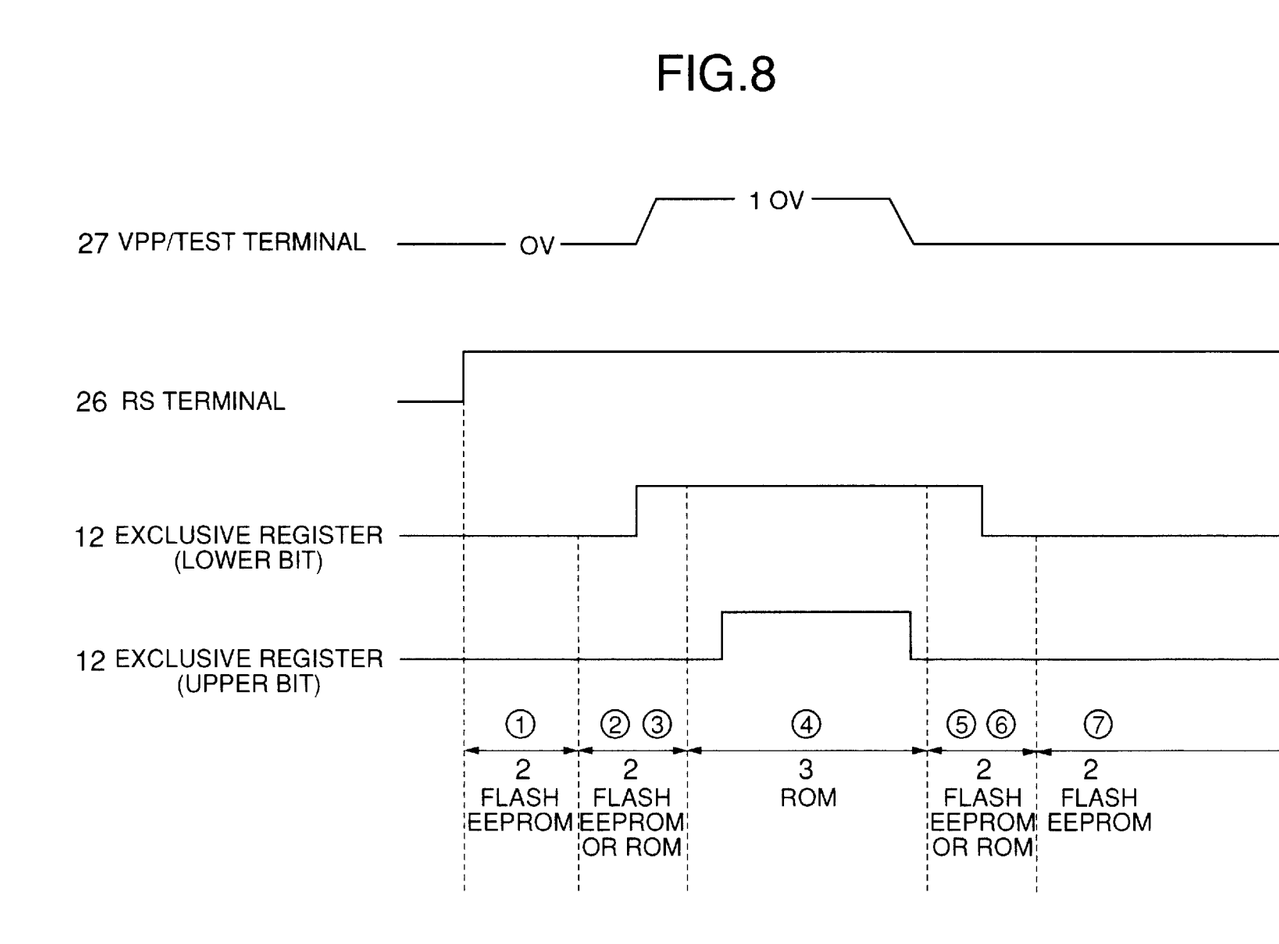
FIG. 8 is a timing chart and transition of access memories in the self-programming mode in an embodiment according to the present invention.

In the self-programming mode 1, since both the ROM 3 and the flash EEPROM 2 can be executed, the process can branch the flash erase/write program in the ROM 3 address assigned to a region except for the boot program area (see (3) in FIGS. 7 and 8).

Thereafter, the process transfers to the mode executable of only the ROM 3 by setting the exclusive register 12 ("11B" in the example) (which is called a "self-programming mode 2"), and branches to the ROM 3 (see (4) in FIGS. 7 and 8).

Thus, erase and write are performed for the flash EEPROM 2 by executing the flash EEPROM erase/write program stored in the ROM 3. After completion of rewriting, the process transfers again to the self-programming mode 1 (see (5) in FIGS. 7 and 8), and then branches again to the flash EEPROM 2 (see (6) in FIGS. 7 and 8).

Thereafter, as the mode transfers to the user programming mode, the process completes a series of program rewriting, and returns back to the normal operation mode, so that the application program rewritten in the flash EEPROM 2 starts to be executed (see (7) in FIGS. 7 and 8).

As described, since the microcomputer according to the example of the present invention can set the self-programming mode 1, when the user wants to erase or write a program, it is possible to rewrite the flash EEPROM without containing a programmable RAM or providing an external memory, and there is no need to evacuate a program, so that the erase/write time can be shortened.

As described above, the microcomputer containing a flash EEPROM therein of the present invention has an advantage that it can rewrite the built-in flash EEPROM only with a ROM storing a user program and an erase/write procedure, without a programmable RAM or an external memory.

In addition, according to the present invention, since there is also no need to evacuate a program, there is an advantage that the erase/write time is shortened.

What is claimed is:

1. A microcomputer containing a flash EEPROM therein, said microcomputer comprising an electrically erasable and programmable read-only memory (called an "EEPROM"), a read-only memory (called a "ROM") storing a program indicating an erase and write procedure for said EEPROM, and a central processing unit (called a "CPU"), said CPU executing an erase and write control program stored in said EEPROM (called a "boot program") and a program stored in said ROM to enable it to erase and write said EEPROM, wherein said microcomputer further comprises a switching means for switching under control of said CPU between placing either one of said EEPROM or said ROM on a memory space and placing both said EEPROM and said ROM on the same memory space, and an arrangement in which the address for a region for storing said boot program does not overlap an address for a region of said ROM, said CPU being switched among a state where it executes only a program in said EEPROM, a state where it can directly and bidirectionally moves between said boot program and a program stored in said ROM, and a state where it executes only the program stored in said ROM, thereby erasing and writing the EEPROM.

2. The microcomputer containing a flash EEPROM therein as set forth in claim 1, wherein said switching means comprises an exclusive register controlled by said CPU, and an address decoder detecting that said CPU accesses an address for the region of said ROM, when said exclusive register is in a first state, said EEPROM being made valid;

when said exclusive register is in a second state, said ROM being made valid;

when said exclusive register is in a third state, said ROM being made valid as said address decoder detects access to the region of said ROM, and said EEPROM being made valid as said address decoder does not detect access to the region of said ROM.

3. The microcomputer containing a flash EEPROM therein as set forth in claim 2, further comprising high voltage detector means for detecting that input voltage at a predetermined external terminal is at any voltage higher than a supply voltage, a detection signal of said the high voltage detector means being input into said switching means, when the detection signal is active, said ROM being forcibly made valid regardless of the state of said exclusive register or of said address decoder, whereby a program stored in said ROM can be executed after the microcomputer is initialized.

4. The microcomputer containing a flash EEPROM therein as set forth in claim 3, wherein the input voltage at the predetermined external terminal can be also used as a power supply for erase and write of said flash EEPROM.

* * * * *